United States Patent
Hoshino et al.

(10) Patent No.: US 8,797,622 B2
(45) Date of Patent: Aug. 5, 2014

(54) SCANNING OPTICAL APPARATUS

(71) Applicant: Brother Kogyo Kabushiki Kaisha, Nagoya-shi, Aichi-ken (JP)

(72) Inventors: Hidetaka Hoshino, Aichi-ken (JP); Yoshifumi Nakamura, Inazawa (JP); Hitoshi Fujino, Tajimi (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/037,597

(22) Filed: Sep. 26, 2013

(65) Prior Publication Data
US 2014/0085696 A1   Mar. 27, 2014

(30) Foreign Application Priority Data
Sep. 27, 2012  (JP) ................. 2012-213522

(51) Int. Cl.
*G02B 26/08*  (2006.01)

(52) U.S. Cl.
USPC .............. 359/196.1; 359/204.5; 359/205.1; 359/216.1

(58) Field of Classification Search
USPC ........................................... 359/196.1–226.2
See application file for complete search history.

(56) References Cited

U.S. PATENT DOCUMENTS

| 2006/0092492 | A1 | 5/2006 | Ishibe |
| 2011/0228368 | A1* | 9/2011 | Sakai et al. ............... 359/204.1 |

FOREIGN PATENT DOCUMENTS

JP  4819436 B2  11/2011

* cited by examiner

*Primary Examiner* — James Phan
(74) *Attorney, Agent, or Firm* — Merchant & Gould PC (57) ABSTRACT

In a scanning optical apparatus, an illumination optical system has a diffractive power $\phi dM$ in a main scanning direction, a diffractive power $\phi dS$ in a sub-scanning direction, a refractive power $\phi nM$ in the main scanning direction, and a refractive power $\phi nS$ in the sub-scanning direction. A ratio $\phi nM/\phi dM$ in the main scanning direction for a focal length fi in a range of 10-30 mm satisfies: $g2(fi) \leq \phi nM/\phi dM \leq g1(fi)$, where $A(Z)=(3.532\times10^7)Z^2+3023Z+0.7010$, $B(Z)=(5.719\times10^7)Z^2+4169Z+0.7678$, $C(Z)=(1.727\times10^7)Z^2+3244Z+0.4217$, $D(Z)=(1.373\times10^8)Z^2+3232Z+1.224$, $g1(fi)=fi\{D(Z)-B(Z)\}/20-0.5D(Z)+1.5B(Z)$, $g2(fi)=fi\{C(Z)-D(Z)\}/20-0.5C(Z)+1.5A(Z)$, and a ratio $\phi nS/\phi dS$ in the sub-scanning direction satisfies: $\phi nS/\phi dS<1.3$.

10 Claims, 12 Drawing Sheets

EXAMPLE 1

| SURFACE No. | SURFACE | RADIUS OF CURVATURE | | DISTANCE | REFRACTIVE INDEX | OPTICAL ELEMENT |
| --- | --- | --- | --- | --- | --- | --- |
| | | MAIN SCANNING DIRECTION | SUB-SCANNING DIRECTION | | | |
| 1 | | ∞ | ∞ | 0.970 | 1 | |
| 2 | | ∞ | ∞ | 0.250 | 1.511 | GLASS COVER |
| 3 | | ∞ | ∞ | 19.11 | 1 | |
| 4 | ELLIPSOIDAL DIFFRACTIVE SURFACE | ∞ | ∞ | 2.000 | 1.527 | DIFFRACTION LENS |
| 5 | ANAMORPHIC SURFACE | −19.377 | −52.737 | 39.16 | 1 | |
| 6 | | ∞ | ∞ | 44.46 | 1 | |
| 7 | ANAMORPHIC SURFACE | 91.577 | −21.931 | 11.00 | 1.503 | f-θ LENS |
| 8 | ANAMORPHIC SURFACE | 382.25 | −12.153 | 133.4 | 1 | |

EXAMPLE 1

IMAGE PLANE SHIFT WITH fi = 20 mm, mM/mS =2.0, $\phi nM/\phi dM$ = 1.151, $\phi nS/\phi dS$ = 0.15

FIG. 13

EXAMPLE 2

| SURFACE No. | SURFACE | RADIUS OF CURVATURE | | DISTANCE | REFRACTIVE INDEX | OPTICAL ELEMENT |
|---|---|---|---|---|---|---|
| | | MAIN SCANNING DIRECTION | SUB-SCANNING DIRECTION | | | |
| 1 | | ∞ | ∞ | 0.970 | 1 | |
| 2 | | ∞ | ∞ | 0.250 | 1.511 | GLASS COVER |
| 3 | | ∞ | ∞ | 19.09 | 1 | |
| 4 | AXISYMMETRIC DIFFRACTIVE SURFACE | ∞ | ∞ | 2.000 | 1.527 | COLLIMATING LENS |
| 5 | AXISYMMETRIC REFRACTIVE SURFACE | -19.361 | | 2.000 | 1 | |
| 6 | LINEARLY-PATTERNED DIFFRACTIVE SURFACE | ∞ | ∞ | 2.000 | 1.527 | CYLINDRICAL LENS |
| 7 | ANAMORPHIC SURFACE | ∞ | 48.182 | 39.42 | 1 | |
| 8 | | ∞ | ∞ | 44.46 | 1 | |
| 9 | ANAMORPHIC SURFACE | 91.577 | -21.931 | 11.00 | 1.503 | f-θ LENS |
| 10 | ANAMORPHIC SURFACE | 382.25 | -12.153 | 133.4 | 1 | |

FIG.14

EXAMPLE 2

IMAGE PLANE SHIFT WITH fi = 20 mm, mM/mS =2.0, $\phi nM/\phi dM$ = 1.151, $\phi nS/\phi dS$ = 0.29

FIG. 15

EXAMPLE 3

| SURFACE No. | SURFACE | RADIUS OF CURVATURE | | DISTANCE | REFRACTIVE INDEX | OPTICAL ELEMENT |
|---|---|---|---|---|---|---|
| | | MAIN SCANNING DIRECTION | SUB-SCANNING DIRECTION | | | |
| 1 | | ∞ | ∞ | 0.970 | 1 | |
| 2 | | ∞ | ∞ | 0.250 | 1.511 | GLASS COVER |
| 3 | | ∞ | ∞ | 19.11 | 1 | |
| 4 | DIFFRACTIVE SURFACE | ∞ | ∞ | 2.000 | 1.527 | DIFFRACTION LENS |
| 5 | ANAMORPHIC REFRACTIVE SURFACE/LINEARLY-PATTERNED DIFFRACTIVE SURFACE | −19.377 | −52.737 | 39.16 | 1 | |
| 6 | | ∞ | ∞ | 44.46 | 1 | |
| 7 | ANAMORPHIC SURFACE | 91.577 | −21.931 | 11.00 | 1.503 | f-θ LENS |
| 8 | ANAMORPHIC SURFACE | 382.25 | −12.153 | 133.4 | 1 | |

FIG.16

SCANNING OPTICAL APPARATUS

CROSS-REFERENCE TO RELATED APPLICATION(S)

This application claims priority from Japanese Patent Application No. 2012-213522 filed on Sep. 27, 2012, the disclosure of which is incorporated herein by reference in its entirety.

TECHNICAL FIELD

The present invention relates to a scanning optical apparatus suitable for use in an electrophotographic image forming apparatus or the like.

BACKGROUND ART

In a scanning optical apparatus for use in an electrophotographic image forming apparatus converts a beam of light emitted from a light source into a dot-like image to be formed on a target surface of a photoconductor drum or the like and scans the target surface in a direction of an axis of the photoconductor drum (main scanning direction) with the dot-like image. The scanning optical apparatus includes a deflector which deflect a beam of light in the main scanning direction, an illumination optical system provided upstream of the deflector, and a scanning optical system provided downstream of the deflector. The illumination optical system focuses the beam of light near the deflector in a sub-scanning direction and makes the same into a parallel or nearly parallel beam in the main scanning direction. On the other hand, the scanning optical system serves to convert the beam of light directed from the deflector, into a dot-like image on the target surface to be scanned.

As the ambient temperature of the scanning optical apparatus (the temperature of the surrounding medium which comes into contact with the apparatus) changes, the dimensions of various parts thereof as well as the properties of various optical elements thereof will change, and the focal point would disadvantageously be shifted forward or backward from the target surface. This problem would be conspicuous when the illumination optical system includes a lens made of plastic (resin) which may be adopted in view of cost reduction. In order to address this problem, the illumination optical system may include a refractive surface and a diffractive surface so that an undesirable shift of the focal point (image plane shift) due to change in temperature is suppressed. For example, it has been assumed to be preferable that a ratio of refractive power to diffractive power of the illumination optical system in the main scanning direction is in a range of 1.437 to 2.669, and that a ratio of refractive power to diffractive power of the illumination optical system in the sub-scanning direction is in a range of 1.437 to 2.669.

SUMMARY

Applicant has noted that coefficients of linear expansion of members for holding the light source and the illumination optical system and a change in temperature of the scanning optical system should be significant, and that a scanning optical apparatus comprising a housing made of resin having a great coefficient of linear expansion would be difficult to achieve sufficient performance.

With this in view, it is one aspect of the present invention to provide a scanning optical apparatus in which proper temperature compensation can be achieved.

More specifically, according to one or more embodiments of the present invention, a scanning optical apparatus is provided which comprises a light source, a deflector, an illumination optical system and a scan lens. The deflector is configured to deflect a beam of light emitted from the light source in a main scanning direction. The illumination optical system is disposed between the light source and the deflector and configured to convert the beam of light emitted from the light source into a beam of light slightly converging in the main scanning direction and focused near the deflector in a sub-scanning direction. The scan lens is configured to cause the beam of light deflected by the deflector to be focused into a dot-like image on a target surface to be scanned. The illumination optical system has a first diffractive power $\phi dM$ in the main scanning direction and a second diffractive power $\phi dS$ in the sub-scanning direction, the first and second diffractive powers being different from each other, and has a first refractive power $\phi nM$ in the main scanning direction and a second refractive power $\phi nS$ in the sub-scanning direction, the first and second refractive powers being different from each other. The illumination optical system has a focal length fi [mm] in the main scanning direction, which satisfies:

$$10 \leq fi \leq 30 \quad (1)$$

A ratio mM/mS of a lateral magnification mM in the main scanning direction to a lateral magnification mS in the sub-scanning direction, of an entire optical system which includes the illumination optical system and the scan lens, satisfies:

$$mM/mS \geq 1.2 \quad (2)$$

A holding member provided to retain a distance between the light source and the illumination optical system has a coefficient Z of linear expansion which satisfies:

$$3.0 \times 10^{-5} \leq Z \leq 9.5 \times 10^{-5} \quad (3)$$

Further, in one embodiment, a ratio $\phi nM/\phi dM$ of the first refractive power $\phi nM$ in the main scanning direction to the first diffractive power $\phi dM$ in the main scanning direction satisfies:

$$g2(fi) \leq \phi nM/\phi dM \leq g1(fi) \quad (4)$$

where $A(Z)=(3.532\times 10^7)Z^2+3023Z+0.7010$, $B(Z)=(5.719\times 10^7)Z^2+4169Z+0.7678$, $C(Z)=(1.727\times 10^7)Z^2+3244Z+0.4217$, $D(Z)=(1.373\times 10^8)Z^2+3232Z+1.224$, $g1(fi)=fi\{D(Z)-B(Z)\}/20-0.5D(Z)+1.5B(Z)$, $g2(fi)=fi\{C(Z)-D(Z)\}/20-0.5C(Z)+1.5A(Z)$, and the focal length fi is in the range as specified above in the inequality (1).

In addition, a ratio $\phi nS/\phi dS$ of the second refractive power $\phi nS$ in the sub-scanning direction to the second diffractive power $\phi dS$ in the sub-scanning direction satisfies:

$$\phi nS/\phi dS<1.3 \quad (5)$$

In another embodiment, the aforementioned conditions (4) and (5) may be replaced with the following conditions (6) and (7), that is, a ratio $\phi nM/\phi dM$ of the first refractive power $\phi nM$ in the main scanning direction to the first diffractive power $\phi dM$ in the main scanning direction satisfies:

$$0.67<\phi nM/\phi dM<1.46 \quad (6)$$

and a ratio $\phi nS/\phi dS$ of the second refractive power $\phi nS$ in the sub-scanning direction to the second diffractive power $\phi dS$ in the sub-scanning direction satisfies:

$$\phi nS/\phi dS<\phi nM/\phi dM \quad (7)$$

BRIEF DESCRIPTION OF THE DRAWINGS

The above aspect, its advantages and further features of the present invention will become more apparent by describing in detail illustrative, non-limiting embodiments thereof with reference to the accompanying drawings, in which.

DESCRIPTION OF EMBODIMENTS

A detailed description will be given of an illustrative, non-limiting embodiment of the present invention with reference made to the drawings where appropriate.

Figure 1:
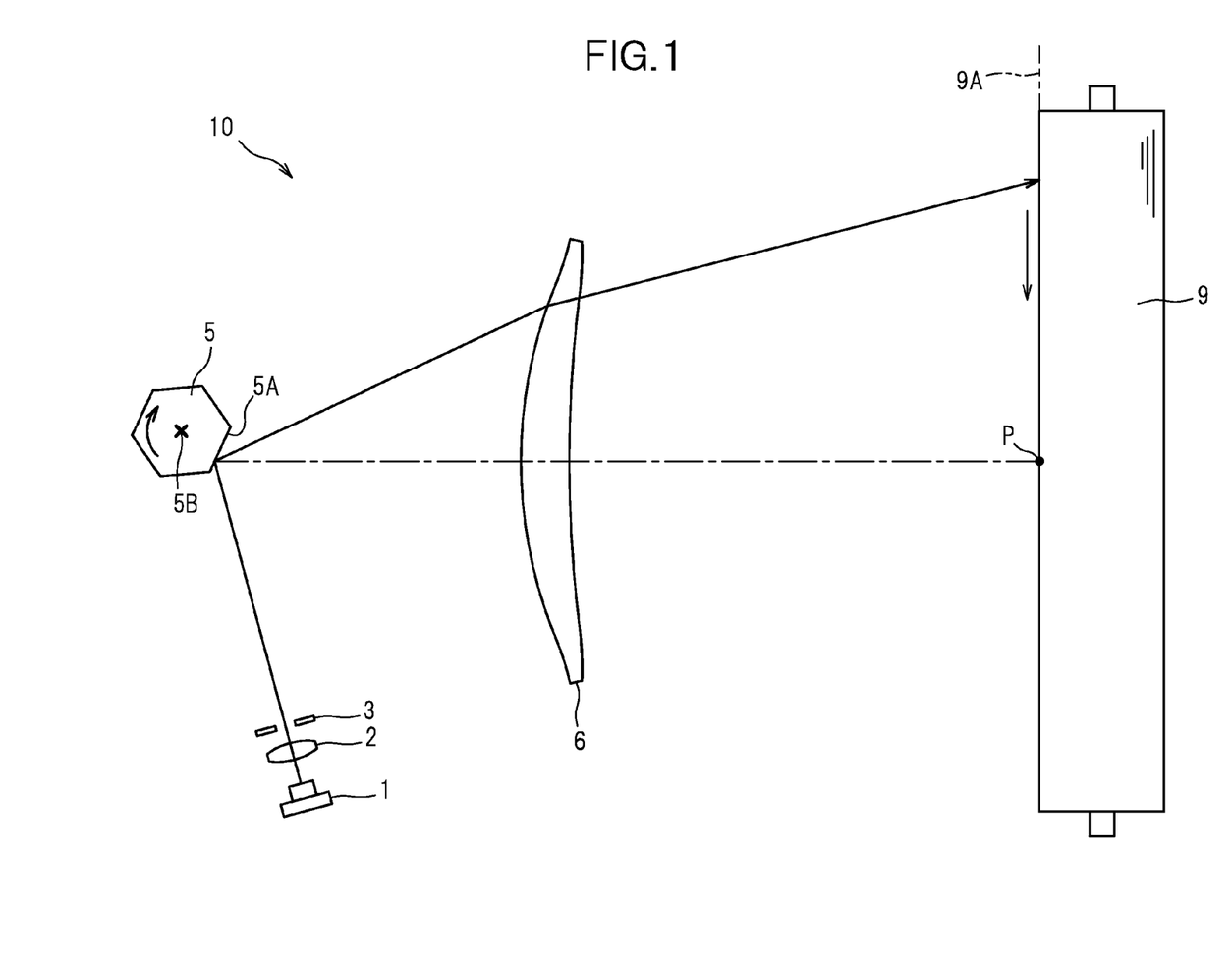
FIG. 1 is a sectional view of a scanning optical apparatus according to one exemplary embodiment taken along a main scanning plane.

As shown in FIG. 1, a scanning optical apparatus 10 according to one embodiment includes a semiconductor laser 1 as an example of a light source, a diffraction lens 2 as an example of an illumination optical system, an aperture stop 3, a polygon mirror 5 as an example of a deflector, and an f-theta lens 6 as an example of a scan lens. With these components, a laser beam emitted from the semiconductor laser 1 is converged into a spot-like image on a target (to-be-scanned) surface 9A of a photoconductor drum 9, and the target surface 9A is scanned with the spot-like image. These components (i.e., semiconductor laser 1, diffraction lens 2, aperture stop 3, polygon mirror 5 and f-theta lens 6) are fixedly arranged on a housing (not shown) made of plastic (resin).

This housing is a holding member provided to retain a distance between the semiconductor laser 1 as a light source and the diffraction lens 2 as an illumination optical system, and the expansion and contraction of the holding member due to change in temperature would affect the quality of an image formed on the target surface 9A. In the scanning optical apparatus 10 configured according to this embodiment, the coefficient Z of linear expansion is in the range of:

$$3.0 \times 10^{-5} \le Z \le 9.5 \times 10^{-5} \qquad (3)$$

In other words, the holding member is made of a material which has a relatively great coefficient Z of linear expansion, such as a resin material. The holding member is not necessarily composed of a single part, but may be an assembly of several parts. For example, the holding member may be a combination of parts made of metal and parts made of resin material. In this case, the resultant of coefficients of linear expansion of these parts which hold the light source and the illumination optical system to thereby retain the distance between them may be considered to be the coefficient Z.

The semiconductor laser 1 is a device (laser diode) configured to generate a slightly divergent laser beam (a beam of light). A light-emitting element of the semiconductor laser 1 is configured to give off and interrupt light emissions in accordance with an image formed on the target surface 9A of the photoconductor drum 9 under control of a controller (not shown).

Figure 2:
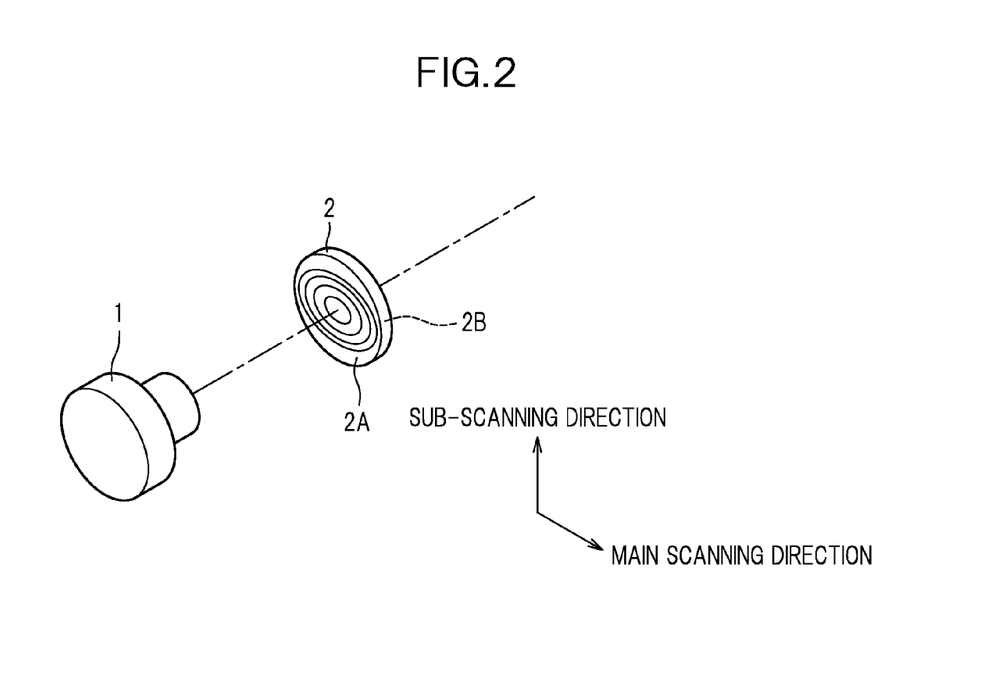
FIG. 2 is a perspective view showing an illumination optical system according to one embodiment.

The diffraction lens 2 is disposed between the semiconductor laser 1 and the polygon mirror 5 and configured to convert the beam of light emitted from the semiconductor laser 1 into a beam of light slightly converging in a main scanning direction (the direction of the beam of light sweeping laterally with respect to the direction of travel thereof in FIG. 1; the direction of deflection thereof effected by the polygon mirror 5) and focused near a specular surface 5A of the polygon minor 5 in a sub-scanning direction (the direction perpendicular to the main scanning direction and to the drawing sheet of FIG. 1). For example, as shown in FIG. 2, the diffraction lens 2 has a diffractive surface 2A at an incident side thereof (on which the beam of light strikes) and a refractive surface 2B at an exit side thereof (from which the beam of light goes out). In view of the costs, it is preferable that the diffraction lens 2 is a single lens made of plastic (resin). However, the illumination optical system consistent with the present invention is not limited to this specific configuration; as will be described later as modified embodiments, the illumination optical system may comprise a lens made of glass, and the number of lenses (surfaces) is not limited to one but may be more as long as the illumination optical system is provided with at least one refractive surface and at least one diffractive surface.

The diffraction lens 2 in this embodiment may be configured, for example, such that the incident-side surface 2A thereof is an ellipsoidal diffractive surface and the exit-side surface 2B is an anamorphic refractive surface. Since the present embodiment is configured to use a single lens as the illumination optical system, the required processing of diffractive surface is limited only to one surface, so that the costs can be reduced accordingly, and the loss of the efficiency of use of light at the diffractive surface can be reduced.

The diffraction lens 2 has a focal length fi [mm] in the main scanning direction, which satisfies:

$$10 \le fi \le 30 \qquad (1)$$

As the focal length fi is not less than 10 mm, the lateral magnification can be moderately restricted so that the magnification will not too great. As the focal length fi is not greater than 30 mm, the apparatus can be designed to be compact in size, and the loss of the efficiency of use of light in the semiconductor laser 1 can be suppressed.

The diffraction lens 2 in this embodiment is designed to fulfill the conditions such that a ratio mM/mS of a lateral magnification mM in the main scanning direction to a lateral magnification mS in the sub-scanning direction, of an entire optical system which includes the illumination optical system and the scan lens, satisfies:

$$mM/mS \geq 1.2 \quad (2)$$

As shown in Examples which will be described later, the ratio of magnification mM/mS in the main scanning direction not less than 1.2 serves to reduce the amount of image plane shift caused by the change in ambient temperature.

The diffraction lens 2 has a first diffractive power φdM in the main scanning direction and a second diffractive power φdS in the sub-scanning direction, which first and second diffractive powers φdM, φdS are different from each other, and has a first refractive power φnM in the main scanning direction and a second refractive power φnS in the sub-scanning direction, which first and second refractive powers φnM, φnS are different from each other. To be more specific, a ratio φnM/φdM of the first refractive power φnM to the first diffractive power φdM of the diffraction lens 2 in the main scanning direction satisfies:

$$g2(fi) \leq \phi nM/\phi dM \leq g1(fi) \quad (4)$$

where $A(Z)=(3.532\times10^7)Z^2+3023Z+0.7010$, $B(Z)=(5.719\times10^7)Z^2+4169Z+0.7678$, $C(Z)=(1.727\times10^7)Z^2+3244Z+0.4217$, $D(Z)=(1.373\times10^8)Z^2+3232Z+1.224$, $g1(fi)=fi\{D(Z)-B(Z)\}/20-0.5D(Z)+1.5B(Z)$, $g2(fi)=fi\{C(Z)-D(Z)\}/20-0.5C(Z)+1.5A(Z)$, and the focal length fi in the main scanning direction is in the range as indicated in inequality (1) above ($10 \leq fi \leq 30$).

Moreover, a ratio φnS/φdS of the second refractive power φnS to the second diffractive power φdS of the diffraction lens 2 in the sub-scanning direction satisfies:

$$\phi nS/\phi dS < 1.3 \quad (5)$$

Since the diffraction lens 2 configured according to this embodiment fulfills the conditions indicated by inequalities (4) and (5), the image plane shift (i.e., a change in the position of image plane due to the change in temperature and the change in wavelength of the beam of light, called "mode hopping") can be suppressed satisfactorily in the both scanning directions (in the main scanning direction and in the sub-scanning direction).

In order to more effectively suppress the image plane shift, the diffraction lens 2 may be configured to satisfy the conditions represented by inequalities (6) and (7) below, in addition to the conditions represented by inequalities (1) and (2). The conditions are as follows:

The ratio φnM/φdM of the first refractive power φnM in the main scanning direction to the first diffractive power φdM in the main scanning direction satisfies:

$$0.67 < \phi nM/\phi dM < 1.46 \quad (6)$$

In addition, a ratio φnS/φdS of the second refractive power φnS in the sub-scanning direction to the second diffractive power φdS in the sub-scanning direction satisfies:

$$\phi nS/\phi dS < \phi nM/\phi dM \quad (7)$$

As will be apparent from the Examples described below, the conditions represented by inequalities (6) and (7) are more restrictive conditions which is expected to reduce the image plane shift more effectively in the both scanning directions (in the main scanning direction and in the sub-scanning direction), to a level lower than that which can be achieved by the conditions represented by inequalities (4) and (5).

The aperture stop 3 is a member having an opening which determines a size in the sub-scanning direction of a beam of light having passed through the diffraction lens 2.

The polygon mirror 5 has a plurality of specular surfaces 5A disposed equidistantly from an axis 5B of rotation of the polygon minor 5; the polygon minor 5 in this embodiment as shown in FIG. 1 has six specular surfaces 5A by way of example. The polygon mirror 5 spins at a constant rotational speed about the axis of rotation 5B and reflects and deflects a beam of light having passed through the aperture stop 3 in the main scanning direction.

The scanning apparatus 10 includes only one f-theta lens 6 in this embodiment. The f-theta lens 6 is configured to convert the beam of light having been reflected and thus deflected by the polygon mirror 5 into a spot-like image to be focused on the target surface 9A to be scanned. The f-theta lens 6 is also configured to correct an optical face tangle error of each specular surface 5A of the polygon mirror 5. The f-theta lens 6 has f-theta characteristics such that the beam of light deflected at a constant angular velocity by the polygon mirror 5 is converted into a beam of light that scans the target surface 9A at a constant linear velocity.

Figure 3:
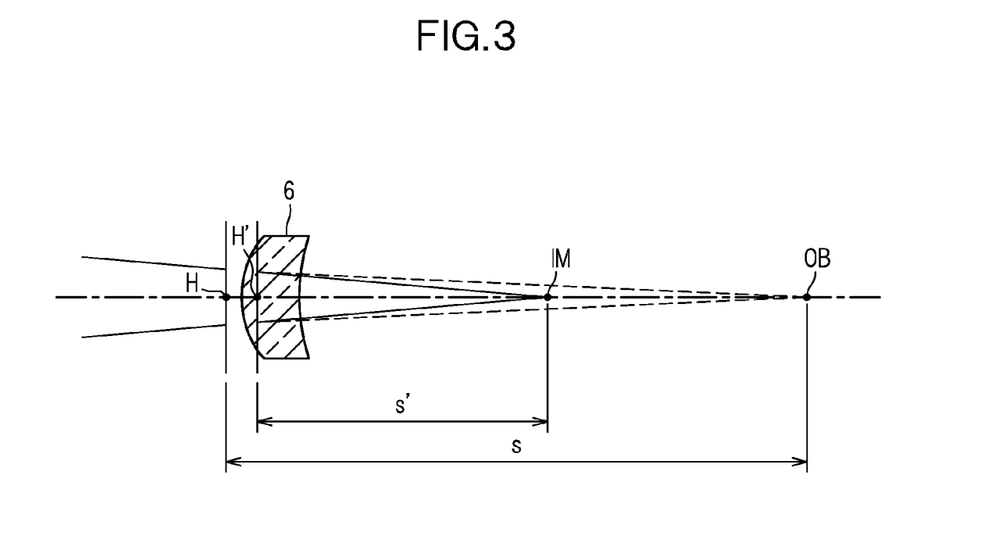
FIG. 3 is a diagram for explaining a lateral magnification of a scan lens.

Referring to FIG. 3, the f-theta lens 6 has a lateral magnification β expressed with several parameters thereof which include a distance s from an object point OB to an object-space principal point H in the main scanning direction, a distance s' from an image-space principal point H' in the main scanning direction to an image point IM, and a focal length fm in the main scanning direction. As $1/fm=1/s'-1/s$ is satisfied, the lateral magnification β of the f-theta lens 6 is represented as follows:

$$\beta = s'/s = 1 - s'/fm$$

In the present embodiment, the lateral magnification β ($=1-s'/fm$) of the f-theta lens 6 is in the following range:

$$0.2 \leq 1 - s'/fm \leq 0.5$$

As the lateral magnification β is not less than 0.2, the scanning optical apparatus 10 can be designed to be compact in size. As the lateral magnification β is not greater than 0.5, the jitter caused by vibrations of the specular surfaces 5A of the polygon mirror 5 can be reduced low.

Although the illustrative embodiment of the present invention has been described above, the present invention is not limited to the above-described embodiments. Various modifications and changes may be made to the specific structures and arrangement without departing from the scope of the present invention.

For example, the diffraction lens 2 in the present embodiment is configured to have a diffractive surface 2A provided at its incident-side and a refractive surface 2B provided at its exit-side, but may be configured vice versa, i.e., it may have a refractive surface provided at its incident side and a diffractive surface provided at its exit-side.

Figure 4:
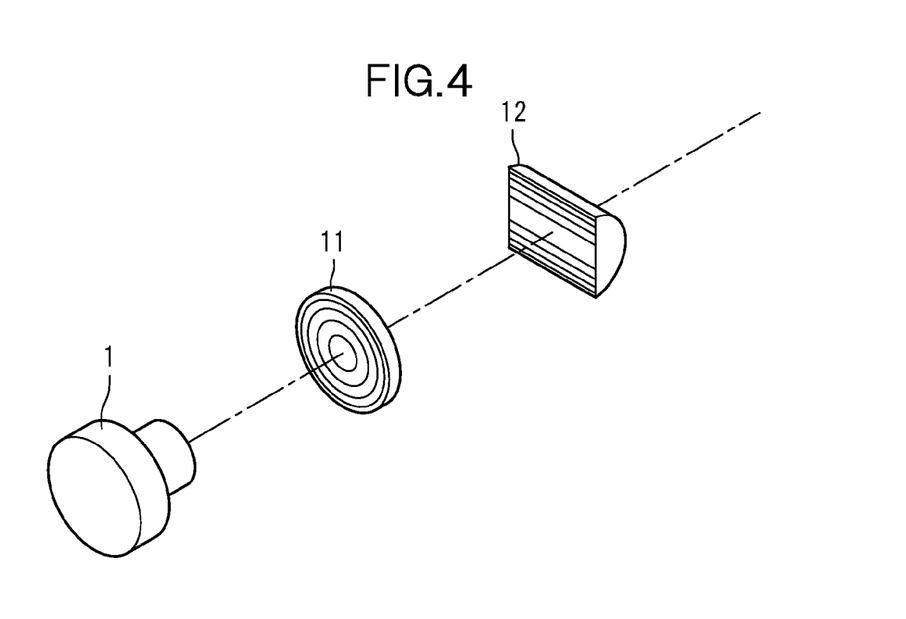
FIG. 4 is a perspective view showing an illumination optical system according to a first modified embodiment.

The illumination optical system in the present embodiment is configured as a single lens having an ellipsoidal diffractive surface and an anamorphic refractive surface, but may be configured as an assembly shown in FIG. 4 that includes a collimating lens 11 which has a rotation-symmetric diffractive surface, and a cylindrical lens 12 which has a diffractive power and a refractive power only in the sub-scanning direction.

Processing of the ellipsoidal diffractive surface on the diffraction lens 2 so as to make the diffraction lens 2 according to the above-described embodiment is relatively difficult, but the illumination optical system configured as an assembly of FIG. 4 can be made with increased ease by combining the collimating lens 11 having a rotation-symmetric diffractive surface, and the cylindrical lens 12 having diffractive and refractive powers only in the sub-scanning direction, so that the diffractive surface can be processed easily.

Figure 5A:
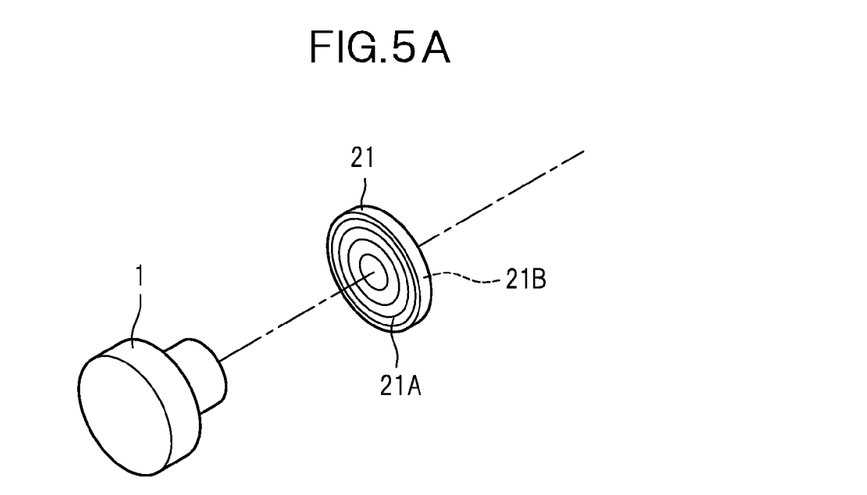
FIG. 5A is a perspective view showing an illumination optical system according to a second modified embodiment.

Alternatively, the illumination optical system may be configured as a single diffractive lens 21 as shown in FIG. 5 which has a rotation-symmetric diffractive surface 21A and an anamorphic refractive surface 21B with a linearly-patterned diffractive surface.

With this configuration, the need for processing an ellipsoidal diffractive surface is obviated, and a necessary diffractive power is realized by combination of the rotation-symmetric diffractive surface 21A and the linearly-patterned diffractive surface in the anamorphic refractive surface 21B, and thus the processing of the diffractive surface can be made with increased ease. In addition, this configuration requires only one lens and thus the illumination optical system can be arranged with ease.

EXAMPLES

Inventors named in the present application and their colleagues have investigated the influence, on the image plane shift associated with the change in ambient temperature, of adjustments made to the diffraction lens 2 (illumination optical system) by varying the ratio $\phi nM/\phi dM$ of the refractive power $\phi nM$ in the main scanning direction to the diffractive power $\phi dM$ in the main scanning direction (hereinafter referred to as "main scanning direction power ratio") and the ratio $\phi nS/\phi dS$ of the second refractive power $\phi nS$ in the sub-scanning direction to the second diffractive power $\phi dS$ in the sub-scanning direction (hereinafter referred to as "sub-scanning direction power ratio").

Example 1

Example 1 illustrates a single-lens implementation of the illumination optical system in which an ellipsoidal diffractive surface and an anamorphic refractive surface are provided. The optical system I1 was configured as specified below, and the main scanning direction power ratio $\phi nM/\phi dM$ and the sub-scanning direction power ratio $\phi nS/\phi dS$ were adjusted so as to reduce the image plane shift associated with temperature change in a range of −5° C. to 55° C., by varying parameters of: (1) coefficient Z of linear expansion of the holding member provided to retain a distance between the light source (semiconductor laser) and the illumination optical system (diffraction lens), (2) magnification ratio mM/mS of the entire optical system (including the diffraction lens and the f-theta lens), and (3) focal length fi of the diffraction lens. The range of each parameter is as follows:

Coefficient Z of linear expansion: $3.0 \times 10^{-5}$ to $9.5 \times 10^{-5}$
Focal length fi [mm]: 10 to 30 mm
Magnification ratio: 1 to 3
<Optical System I1>
Wavelength of semiconductor laser: 788 [nm]
Rate of change in wavelength of semiconductor laser: 0.25 [nm/° C.]
Phase function of diffractive surface:

$$\phi = \sum_m \sum_n C_N x^m y^n$$

$$N = 0.5[(m+n)^2 + m + 3n]$$

$C_N$ (quadric term) in the main scanning direction of the fourth surface (ellipsoidal diffractive surface): −0.01181

$C_N$ (quadric term) in the sub-scanning direction of the fourth surface (ellipsoidal diffractive surface): −0.03252

Figure 6:
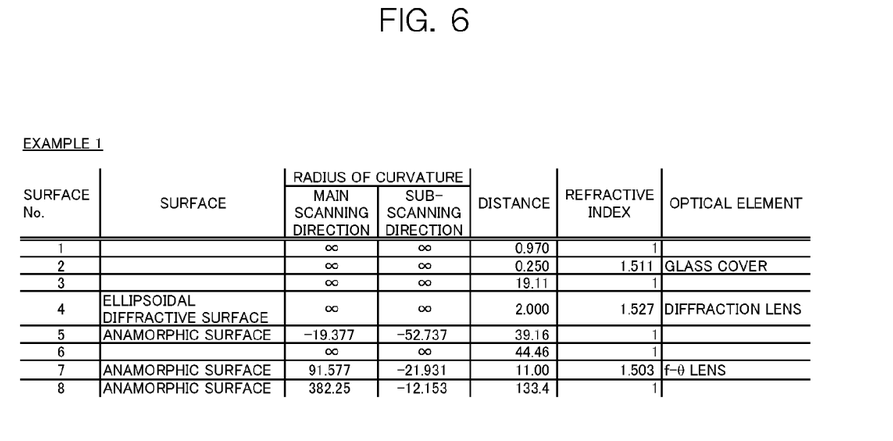
FIG. 6 is a table showing data of an optical system of Example 1.

Other data for the optical system I1 for Example 1 is shown in FIG. 6.

Figure 7:
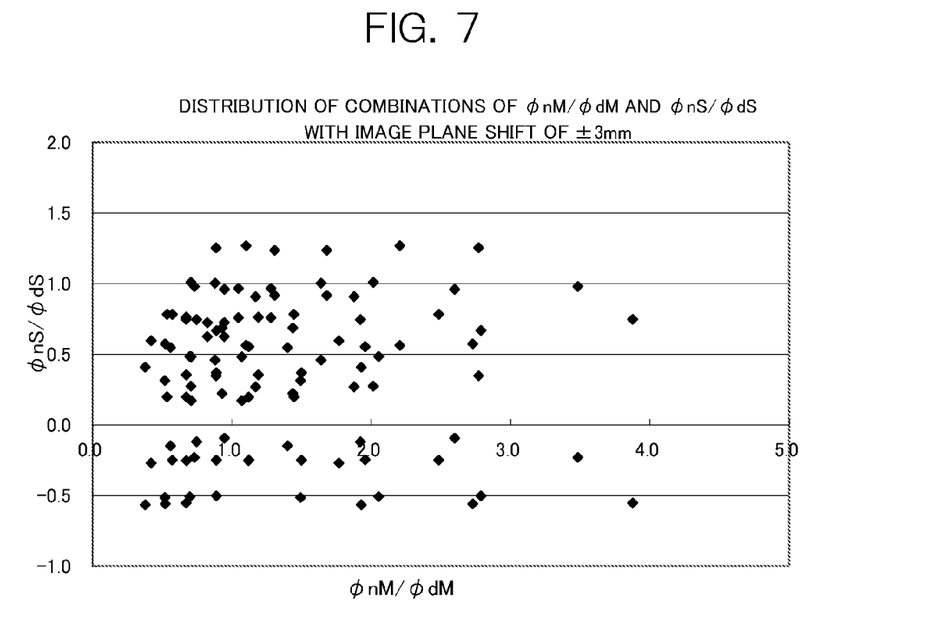
FIG. 7 is a graph showing distribution of combinations of φnM/φdM and φnS/φdS with an image plane shift of ±3 mm.

FIG. 7 shows distribution of combinations of the main scanning direction power ratio $\phi nM/\phi dM$ and sub-scanning direction power ratio $\phi nS/\phi dS$ with which the image plane shift became 3 mm or −3 mm (hereinafter referred to simply as "±3 mm") As evident from FIG. 7, it has been shown that the image plane shift associated with temperature change in the range of −5° C. to 55° C. can be restricted to 3 mm or less if $\phi nS/\phi dS$ is less than 1.3 (the greatest of the values of $\phi nS/\phi dS$ of dots plotted in FIG. 7 was 1.27).

Figure 8:
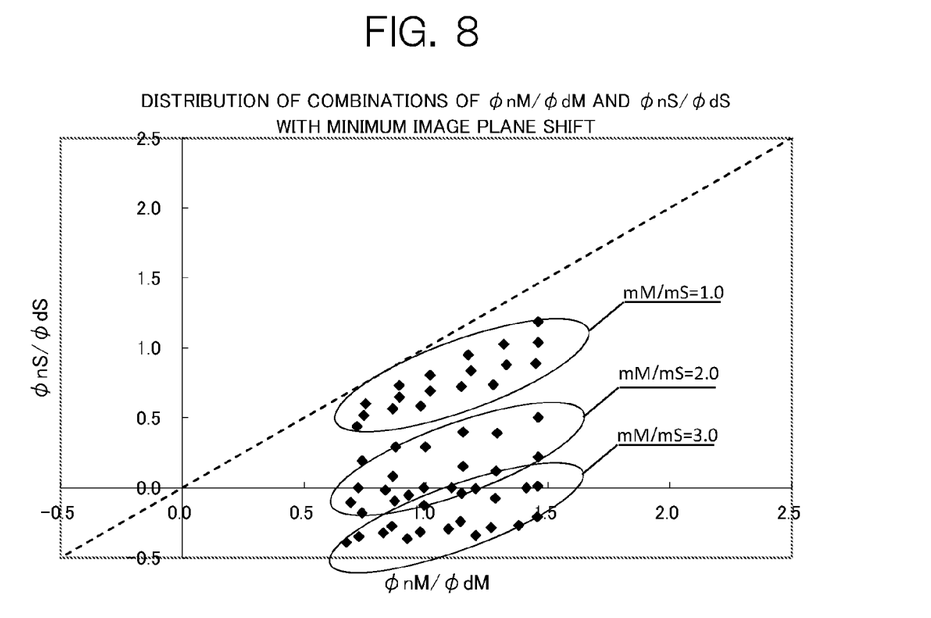
FIG. 8 is a graph showing distribution of combinations of φnM/φdM and φnS/φdS with a minimum image plane shift.

FIG. 8 shows distribution of combinations of the main scanning direction power ratio $\phi nM/\phi dM$ and sub-scanning direction power ratio $\phi nS/\phi dS$ with which the minimum image plane shift was achieved. As seen in FIG. 8, when the image plane shift exhibits the minimum value, the main scanning direction power ratios $\phi nM/\phi dM$ are distributed in the range of approximately 0.7 to 1.5, and the sub-scanning direction power ratios $\phi nS/\phi dS$ are distributed below the line of $\phi nS/\phi dS=\phi nM/\phi dM$ indicated by a broken line. It has thus been shown that the relationship $\phi nS/\phi dS<\phi nM/\phi dM$ is established. From distributions of dots as grouped in FIG. 8 by magnification ratios mM/mS (each magnification-ratio group of dots is enclosed with a line in FIG. 8), it has been shown that the values of sub-scanning direction power ratio $\phi nS/\phi dS$ are greater according as the magnification ratio mM/mS is smaller, and the values of sub-scanning direction power ratio $\phi nS/\phi dS$ are smaller according as the magnification ratio mM/mS is greater.

Figure 9:
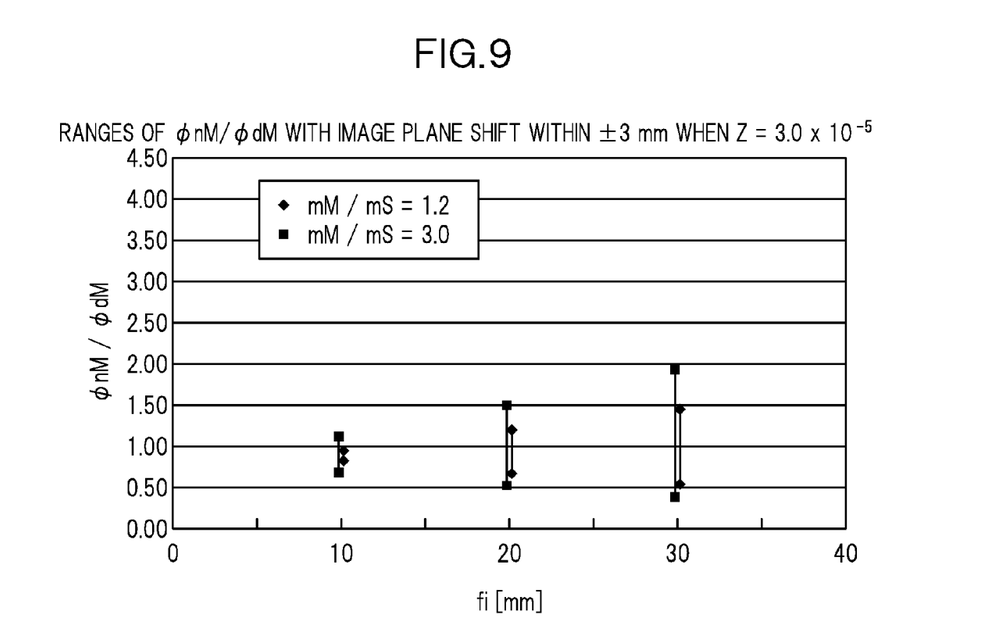
FIG. 9 is a graph showing ranges of power ratios φnM/φdM in the main scanning direction with an image plane shift falling within ±3 mm, when a coefficient Z of linear expansion is $3.0 \times 10^{-5}$.
Figure 10:
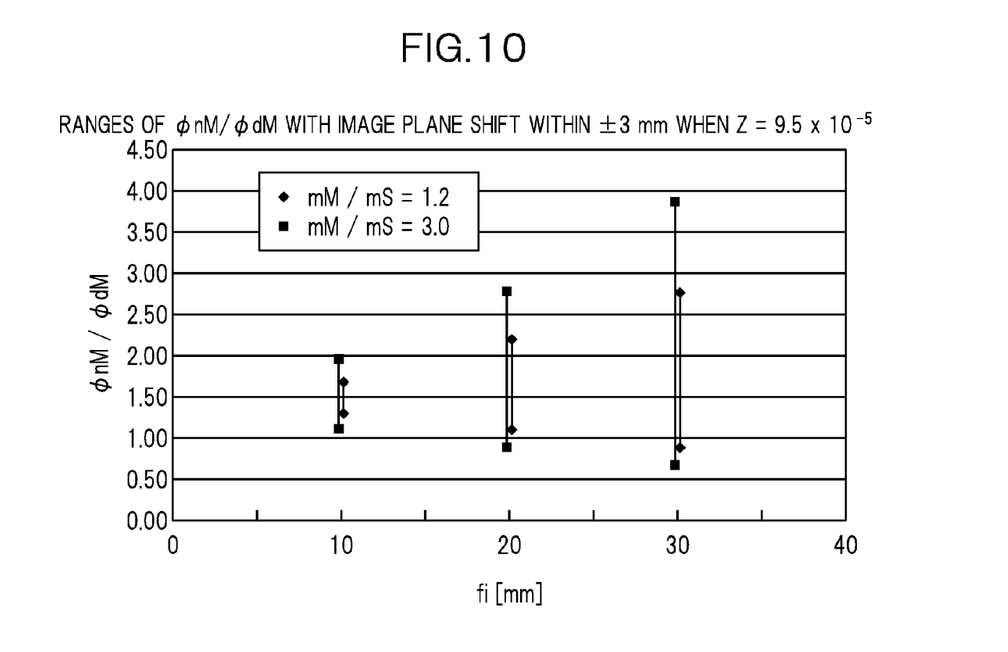
FIG. 10 is a graph showing ranges of power ratios φnM/φdM in the main scanning direction with an image plane shift falling within ±3 mm, when a coefficient Z of linear expansion is $9.5 \times 10^{-5}$.

FIG. 9 is a graph showing ranges of main scanning direction power ratios $\phi nM/\phi dM$ with the image plane shift falling within ±3 mm, when the coefficient Z of linear expansion was $3.0 \times 10^{-5}$. FIG. 10 is a graph showing ranges of main scanning direction power ratios $\phi nM/\phi dM$ with the image plane shift falling within ±3 mm, when the coefficient Z of linear expansion was $9.5 \times 10^{-5}$. In FIGS. 9 and 10, the ranges of the main scanning direction power ratios $\phi nM/\phi dM$ are shown for the magnification ratio mM/mS of 1.2 and for the magnification ratio mM/mS of 3.0. As apparent from these graphs, the range of $\phi nM/\phi dM$ with the image plane shift falling within ±3 mm in the smaller magnification ratio (i.e., mM/mS=1.2) is narrower than that in the greater magnification ratio (i.e., mM/mS=3.0). Conversely, the larger magnification ratio provides the wider range of $\phi nM/\phi dM$ which limits the image plane shift within ±3 mm, than the smaller magnification ratio does. This means that the larger magnification ratio makes the image plane shift easy to reduce. This propensity was also exhibited when the coefficient Z of linear expansion was $6.5 \times 10^{-5}$.

Turning back to FIG. 8, it is shown that the relationship between the magnification ratio mM/mS and the sub-scanning direction power ratio $\phi nS/\phi dS$ has characteristics such that the greater the magnification ratio, the sub-scanning direction power ratio $\phi nS/\phi dS$ becomes smaller. On the other hand, it is shown that the greater the magnification ratio, the image plane shift is likely to become smaller, as described above. Consequently, it is appreciated that the image plane shift is likely to become smaller in the range of the smaller sub-scanning direction power ratio $\phi nS/\phi dS$ where no dot is plotted in FIG. 8 (i.e., the range in which $\phi nS/\phi dS$ is not greater than −0.5). The same can be concluded from the distribution map shown in FIG. 7. It is thus confirmed, from FIG. 7, that if the sub-scanning direction power ratio φnS/φdS satisfies:

$$\phi nS/\phi dS < 1.3 \quad (5)$$

then the image plane shift can be reduced, so that an improved temperature compensation is achieved. It is also confirmed, from FIG. 8, that the sub-scanning direction power ratio φnS/φdS satisfies:

$$\phi nS/\phi dS < \phi nM/\phi dM \quad (7)$$

then the image plane shift can be further reduced, so that an improved temperature compensation is achieved.

Figure 11:
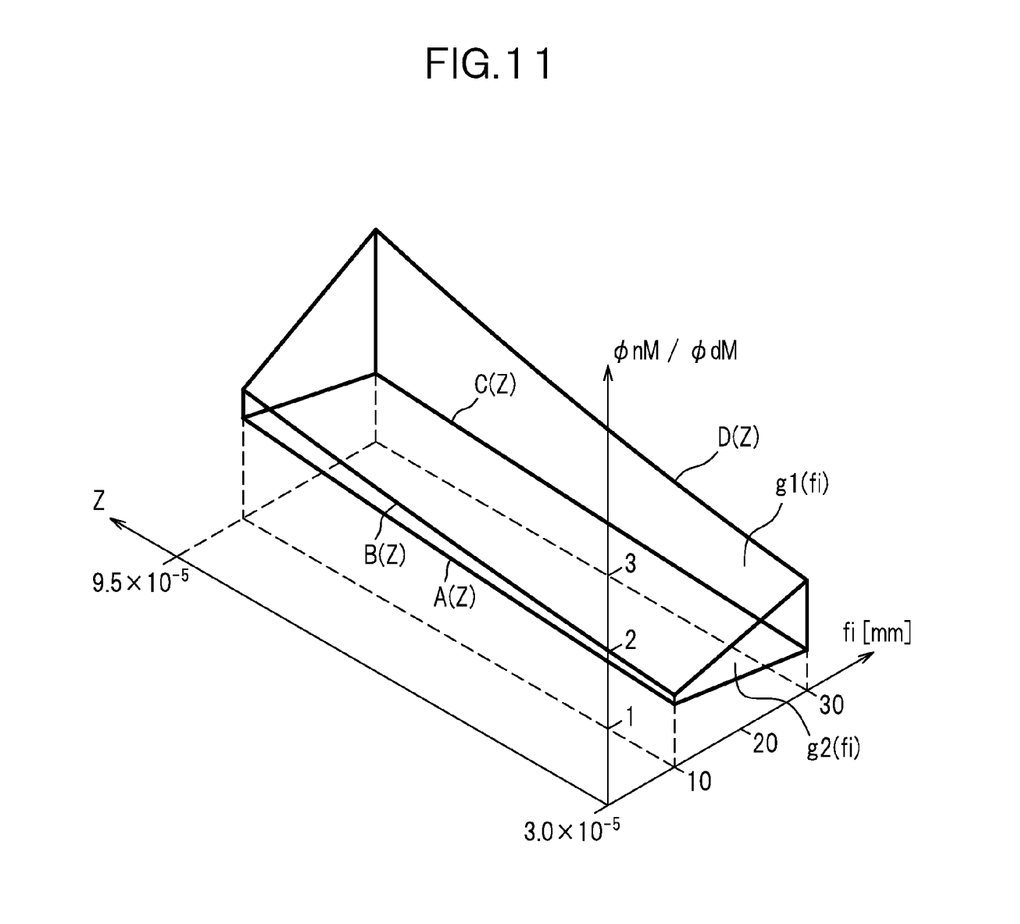
FIG. 11 is a graph showing ranges of power ratios φnM/φdM in the main scanning direction with an image plane shift falling within ±3 mm.

Next, the main scanning direction power ratio φnM/φdM is brought up for discussion. As shown in FIGS. 9 and 10, the range of the main scanning direction power ratio φnM/φdM with the image plane shift falling within ±3 mm is narrower according as the magnification ratio is smaller. Therefore, it is appreciated that if an image is focused properly with the magnification ratio=1.2 which is the tougher condition, then an image is focused properly under the condition of the magnification ratio=3.0 as well. Based upon the results shown in FIGS. 9 and 10 and a similar result (not shown in the drawings) obtained with the coefficient Z of linear expansion=6.5× 10$^{-5}$, the ranges of the main scanning direction power ratios φnM/φdM with the image plane shift falling within ±3 mm (for the magnification ratio=1.2) is depicted in FIG. 11. As long as the main scanning direction power ratio φnM/φdM which varies according to the values of the focus length fi and the coefficient Z of linear expansion falls within the region defined between a curved surface g1(fi) and a curved surface g2(fi), the image plane shift can be restricted to within ±3 mm. In FIG. 11, ridge lines A(Z), B(Z), C(Z) and D(Z) are quadric curves obtained by approximation from the dots plotted for three values of the coefficient Z of linear expansion: 3.0×10$^{-5}$, 6.5×10$^{-5}$ and 9.5×10$^{-5}$. By making use of the ridge lines A(Z), B(Z), C(Z) and D(Z), it is appreciated that an optimized range of the main scanning direction power ratio φnM/φdM for the focal length fi in the range of 10-30 mm can be obtained, as represented by the following inequality (4):

$$g2(fi) \leq \phi nM/\phi dM \leq g1(fi) \quad (4)$$

where
A(Z)=(3.532×10$^7$)Z$^2$+3023Z+0.7010,
B(Z)=(5.719×10$^7$)Z$^2$+4169Z+0.7678,
C(Z)=(1.727×10$^7$)Z$^2$+3244Z+0.4217,
D(Z)=(1.373×10$^8$)Z$^2$+3232Z+1.224,
g1(fi)=fi {D(Z)−B(Z)}/20−0.5D(Z)+1.5B(Z), and
g2(fi)=fi {C(Z)−D(Z)}/20−0.5C(Z)+1.5A(Z).

Figure 12:
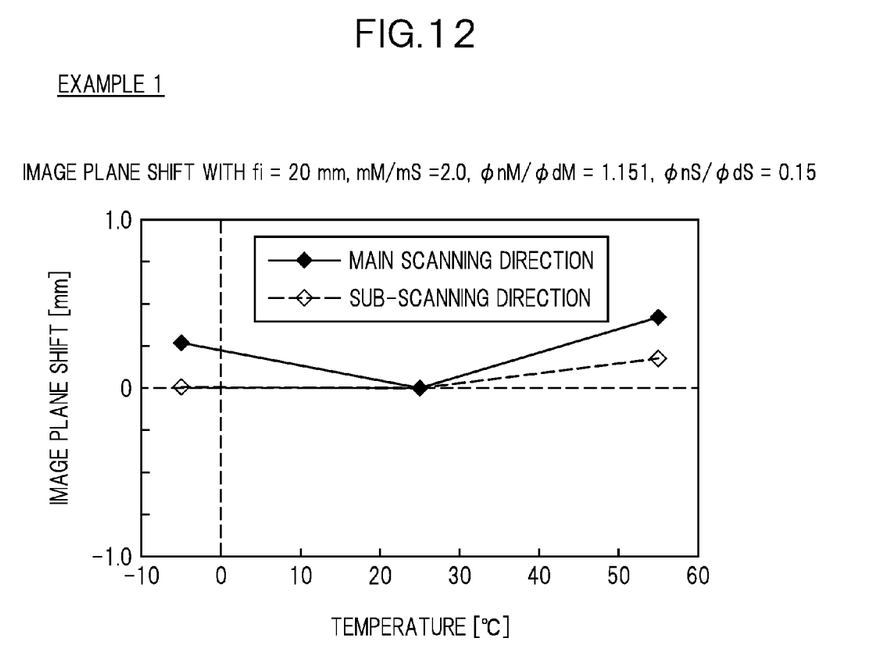
FIG. 12 is a graph showing a change in the position of an image plane with temperature in Example 1.

The above-described optical system I1 implemented with the focal length fi=20 mm, the magnification ratio mM/mS=2.0, the main scanning direction power ratio φnM/φdM=1.151, the sub-scanning direction power ratio φnS/φdS=0.15 was operated, and the resulting amounts of image plane shift (values of the difference in the image plane position) is shown in FIG. 12, wherein the maximum amount of image plane shift was 0.424 mm, though the values of the difference in the image plane position plotted in the graph of FIG. 12 were values obtained without consideration of the change in wavelength of the laser beam due to mode hopping of the semiconductor laser 1.

Even when the change in the wavelength of the laser beam ±1 nm is assumed to happen due to the mode hopping, the maximum amount of the resulting image plane shift is 2.075 mm. Therefore, it has been confirmed that the image plane shift was restricted to the range not exceeding ±3 mm.

Example 2

Example 2 illustrates a combined-lens implementation of the illumination optical system as shown in FIG. 4, in which a collimating lens 11 having a rotation-symmetric diffractive surface and a cylindrical lens 12 having a diffractive power and a refractive power only in the sub-scanning direction are provided. In this implementation as well, it has been confirmed that the image plane shift associated with temperature change in a range of −5° C. to 55° C. can be restricted to the range not exceeding ±3 mm by adjusting the main scanning direction power ratio φnM/φdM and the sub-scanning direction power ratio φnS/φdS in the ranges as described above. The optical system I2 was configured as specified below.

<Optical System I2>
Wavelength of semiconductor laser: 788 [nm]
Rate of change in wavelength of semiconductor laser: 0.25 [nm/° C.]
Phase function of diffractive surface:

$$\phi = \sum_m \sum_n C_N x^m y^n$$

$$N = 0.5[(m+n)^2 + m + 3n]$$

$C_N$ (quadric term) of the fourth surface (rotation-symmetric diffractive surface): −0.01181
$C_N$ (quadric term) in the sub-scanning direction of the sixth surface (linearly-patterned diffractive surface): −0.01638

Figure 13:
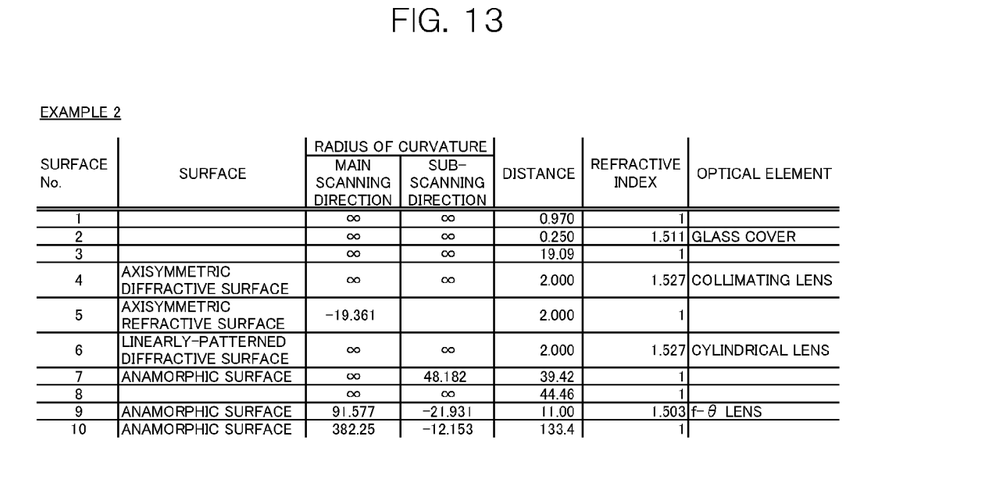
FIG. 13 is a table showing data of an optical system of Example 2.
Figure 14:
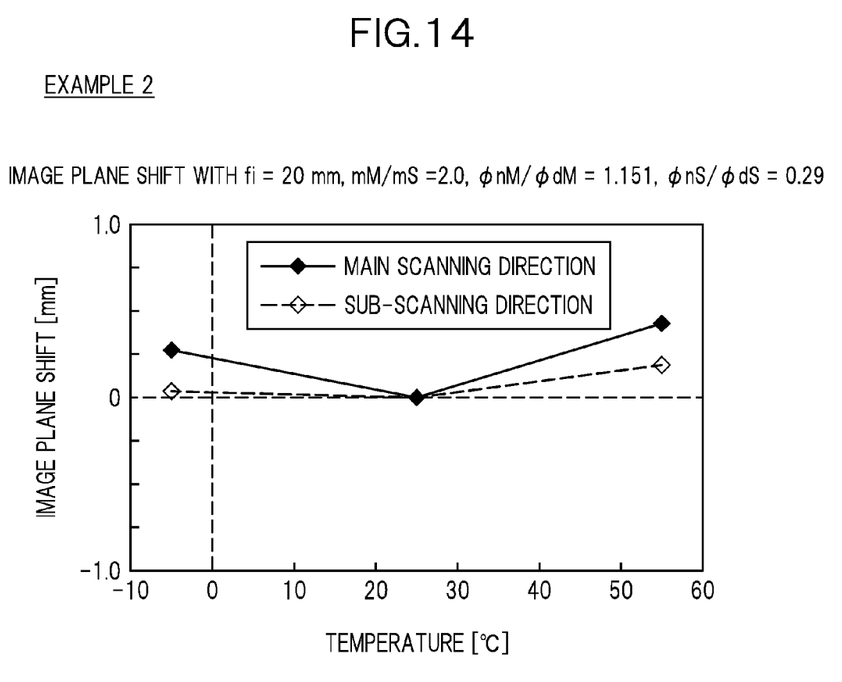
FIG. 14 is a graph showing a change in the position of an image plane with temperature in Example 2.

Other data for the optical system I2 for Example 2 is shown in FIG. 13. The above-described optical system I2 implemented with the focal length fi=20 mm, the magnification ratio mM/mS=2.0, the main scanning direction power ratio φnM/φdM=1.153, the sub-scanning direction power ratio φnS/φdS=0.29 was operated, and the resulting amounts of image plane shift (values of the difference in the image plane position) is shown in FIG. 14, wherein the maximum amount of image plane shift was 0.431 mm, though the values of the difference in the image plane position plotted in the graph of FIG. 14 were values obtained without consideration of the change in wavelength of the laser beam due to mode hopping of the semiconductor laser 1.

Even when the change in the wavelength of the laser beam ±1 nm is assumed to happen due to the mode hopping, the maximum amount of the resulting image plane shift is 2.106 mm Therefore, it has been confirmed that the image plane shift was restricted to the range not exceeding ±3 mm.

Example 3

Figure 5B:
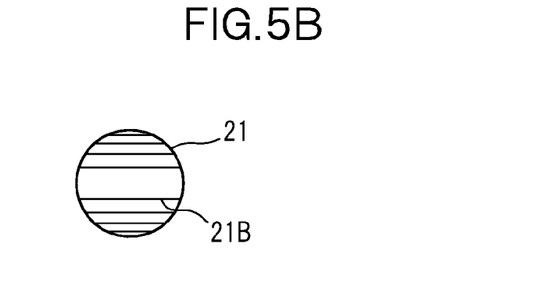
FIG. 5B is a front view of an exit-side surface of the illumination optical system of FIG. 5A.

Example 3 illustrates a single-lens implementation of the illumination optical system as shown in FIGS. 5A and 5B, in which a rotation-symmetric diffractive surface 21A and an anamorphic refractive surface 21B having a linearly-patterned diffractive surface are provided. In this implementation as well, it has been confirmed that the image plane shift associated with temperature change in a range of −5° C. to 55° C. can be restricted to the range not exceeding ±3 mm by adjusting the main scanning direction power ratio φnM/φdM and the sub-scanning direction power ratio φnS/φdS in the ranges as described above. The optical system I3 was configured as specified below.

<Optical System I3>
Wavelength of semiconductor laser: 788 [nm]
Rate of change in wavelength of semiconductor laser: 0.25 [nm/° C.]
Phase function of diffractive surface:

$$\phi = \sum_m \sum_n C_N x^m y^n$$

$$N = 0.5[(m+n)^2 + m + 3n]$$

Figure 15:
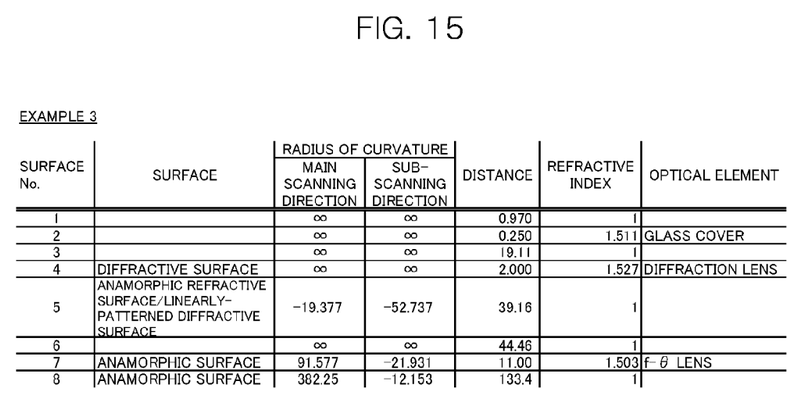
FIG. 15 is a table showing data of an optical system of Example 3.

$C_N$ (quadric term) of the fourth surface (rotation-symmetric diffractive surface): −0.01181
$C_N$ (quadric term) in the sub-scanning direction of the fifth surface (linearly-patterned diffractive surface): −0.02069
Other data for the optical system I3 for Example 3 is shown in FIG. 15.

Figure 16:
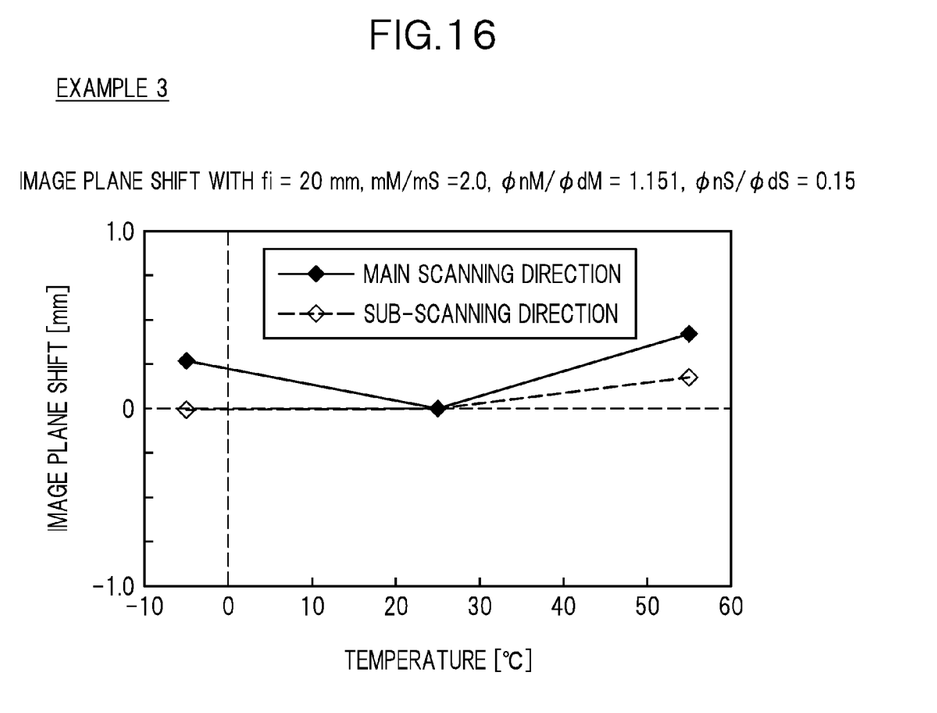
FIG. 16 is a graph showing a change in the position of an image plane with temperature in Example 3.

The above-described optical system I3 implemented with the focal length fi=20 mm, the magnification ratio mM/mS=2.0, the main scanning direction power ratio φnM/φdM=1.151, the sub-scanning direction power ratio φnS/φdS=0.15 was operated, and the resulting amounts of image plane shift (values of the difference in the image plane position) is shown in FIG. 16, wherein the maximum amount of image plane shift was 0.424 mm, though the values of the difference in the image plane position plotted in the graph of FIG. 16 were values obtained without consideration of the change in wavelength of the laser beam due to mode hopping of the semiconductor laser 1.

Even when the change in the wavelength of the laser beam ±1 nm is assumed to happen due to the mode hopping, the maximum amount of the resulting image plane shift is 2.075 mm. Therefore, it has been confirmed that the image plane shift was restricted to the range not exceeding ±3 mm.

What is claimed is:
1. A scanning optical apparatus comprising:
a light source;
a deflector configured to deflect a beam of light from the light source in a main scanning direction;
an illumination optical system disposed between the light source and the deflector and configured to convert the beam of light emitted from the light source into a beam of light slightly converging in the main scanning direction and focused near the deflector in a sub-scanning direction; and
a scan lens configured to cause the beam of light deflected by the deflector to be focused into a dot-like image on a target surface to be scanned,
wherein the illumination optical system has a first diffractive power if φdM in the main scanning direction and a second diffractive power φdS in the sub-scanning direction, the first and second diffractive powers being different from each other, and has a first refractive power φnM in the main scanning direction and a second refractive power φnS in the sub-scanning direction, the first and second refractive powers being different from each other,
wherein the illumination optical system has a focal length fi [mm] in the main scanning direction, which satisfies:

$$10 \leq fi \leq 30;$$

wherein a ratio mM/mS of a lateral magnification mM in the main scanning direction to a lateral magnification mS in the sub-scanning direction, of an entire optical system which includes the illumination optical system and the scan lens, satisfies:

$$mM/mS \geq 1.2;$$

wherein a holding member provided to retain a distance between the light source and the illumination optical system has a coefficient Z of linear expansion which satisfies:

$$3.0 \times 10^{-5} \leq Z \leq 9.5 \times 10^{-5};$$

wherein a ratio φnM/φdM of the first refractive power φnM in the main scanning direction to the first diffractive power φdM in the main scanning direction satisfies:

$$g2(fi) \leq \phi nM/\phi dM \leq g1(fi)$$

where $A(Z)=(3.532\times10^7)Z^2+3023Z+0.7010$, $B(Z)=(5.719\times10^7)Z^2+4169Z+0.7678$, $C(Z)=(1.727\times10^7)Z^2+3244Z+0.4217$, $D(Z)=(1.373\times10^8)Z^2+3232Z+1.224$, $g1(fi)=fi\{D(Z)-B(Z)\}/20-0.5D(Z)+1.5B(Z)$, $g2(fi)=fi\{C(Z)-D(Z)\}/20-0.5C(Z)+1.5A(Z)$; and
wherein a ratio φnS/φdS of the second refractive power φnS in the sub-scanning direction to the second diffractive power φdS in the sub-scanning direction satisfies:

$$\phi nS/\phi dS < 1.3.$$

2. The scanning optical apparatus according to claim 1, wherein the scan lens satisfies:

$$0.2 \leq 1-s'/fm \leq 0.5$$

where s' is a distance from an image-space principal point in the main scanning direction to an image point, and fm is a focal length in the main scanning direction.

3. The scanning optical apparatus according to claim 1, wherein the illumination optical system is a single lens having an ellipsoidal diffractive surface and an anamorphic refractive surface.

4. The scanning optical apparatus according to claim 1, wherein the illumination optical system includes a collimating lens having a rotation-symmetric diffractive surface, and a cylindrical lens having a diffractive power and a refractive power only in the sub-scanning direction.

5. The scanning optical apparatus according to claim 1, wherein the illumination optical system is a single lens having a rotation-symmetric diffractive surface, and an anamorphic refractive surface with a linearly-patterned diffractive surface.

6. A scanning optical apparatus comprising:
a light source;
a deflector configured to deflect a beam of light from the light source in a main scanning direction;
an illumination optical system disposed between the light source and the deflector and configured to convert the beam of light emitted from the light source into a beam of light slightly converging in the main scanning direction and focused near the deflector in a sub-scanning direction; and
a scan lens configured to cause the beam of light deflected by the deflector to be focused into a dot-like image on a target surface to be scanned,
wherein the illumination optical system has a first diffractive power φdM in the main scanning direction and a second diffractive power φdS in the sub-scanning direction, the first and second diffractive powers being different from each other, and has a first refractive power φnM in the main scanning direction and a second refractive power ϕnS in the sub-scanning direction, the first and second refractive powers being different from each other, wherein the illumination optical system has a focal length fi [mm] in the main scanning direction, which satisfies:

$10 \le fi \le 30$;

wherein a ratio mM/mS of a lateral magnification mM in the main scanning direction to a lateral magnification mS in the sub-scanning direction, of an entire optical system which includes the illumination optical system and the scan lens, satisfies:

$mM/mS \ge 1.2$;

wherein a holding member provided to retain a distance between the light source and the illumination optical system has a coefficient Z of linear expansion which satisfies:

$3.0 \times 10^{-5} \le Z \le 9.5 \times 10^{-5}$;

wherein a ratio ϕnM/ϕdM of the first refractive power ϕnM in the main scanning direction to the first diffractive power ϕdM in the main scanning direction satisfies:

$0.67 < \phi nM/\phi dM < 1.46$; and wherein a ratio ϕnS/ϕdS of the second refractive power ϕnS in the sub-scanning direction to the second diffractive power ϕdS in the sub-scanning direction satisfies:

$\phi nS/\phi dS < \phi nM/\phi dM$.

7. The scanning optical apparatus according to claim 6, wherein the scan lens satisfies:

$0.2 \le 1 - s'/fm \le 0.5$ where s' is a distance from an image-space principal point in the main scanning direction to an image point, and fm is a focal length in the main scanning direction.

8. The scanning optical apparatus according to claim 6, wherein the illumination optical system is a single lens having an ellipsoidal diffractive surface and an anamorphic refractive surface.

9. The scanning optical apparatus according to claim 6, wherein the illumination optical system includes a collimating lens having a rotation-symmetric diffractive surface, and a cylindrical lens having a diffractive power and a refractive power only in the sub-scanning direction.

10. The scanning optical apparatus according to claim 6, wherein the illumination optical system is a single lens having a rotation-symmetric diffractive surface, and an anamorphic refractive surface with a linearly-patterned diffractive surface.

* * * * *